US006350712B1

(12) United States Patent
Cabrera-llanos

(10) Patent No.: US 6,350,712 B1
(45) Date of Patent: Feb. 26, 2002

(54) SOLAR CONTROL GLASS COMPOSITION

(75) Inventor: Roberto Marcos Cabrera-llanos, Estado de México (MX)

(73) Assignee: Vitro Corporativo, S.A. DE C.V., Garza Garcia (MX)

(*) Notice: Subject to any disclaimer, the term of this patent is extended or adjusted under 35 U.S.C. 154(b) by 0 days.

(21) Appl. No.: 09/491,605

(22) Filed: Jan. 26, 2000

(51) Int. Cl.$^7$ .............................................. C03C 3/087
(52) U.S. Cl. ....................................................... 501/71
(58) Field of Search .......................................... 501/71

(56) References Cited

U.S. PATENT DOCUMENTS

| | | | |
|---|---|---|---|
| 4,312,953 A | * 1/1982 | Mills et al. | 501/71 |
| 4,792,536 A | 12/1988 | Pecoraro et al. | 501/70 |
| 5,077,133 A | 12/1991 | Cheng | 428/426 |
| 5,112,778 A | 5/1992 | Cheng et al. | 501/31 |
| 5,214,008 A | 5/1993 | Beckwith et al. | 501/69 |
| 5,240,886 A | 8/1993 | Gulotta et al. | 501/70 |
| 5,308,805 A | 5/1994 | Baker et al. | 501/71 |
| 5,670,433 A | * 9/1997 | Amundson, Jr. | 501/71 |
| 5,728,471 A | * 3/1998 | Dupont et al. | 501/71 |
| 5,776,845 A | 7/1998 | Boulos et al. | 501/70 |
| 5,830,812 A | 11/1998 | Shelestak et al. | 501/71 |
| 5,910,461 A | * 6/1999 | Gasca et al. | 501/71 |

OTHER PUBLICATIONS

Weyl, Woldemar A., "Coloured Glasses", *Society of Glass Technology*, (Reprinted 1992).

Bamford, C.R., *Colour Generation and Control in Glass*, Glass Science and Technology, Elsevier Science Publishing Company, Amsterdam, 1977.

Fyles, K.M., "Modern Automotive Glasses", Glass Technology, vol. 37, No. 1, Feb. 1996.

Vogel, Werner *Glass Chemistry*, Springer–Verlag, Berlin, 1985.

Brewster, Gordon F., "The Color of Iron–Containing Glasses of Varying Composition", *Journal of the Society of Glass Technology*, Apr. 1950, pp. 332–406.

Densem, N.E., Turner, W.E.S., "The Equilibrium Between Ferrous and Ferric Oxides in Glasses", *Journal of the Society of Glass Technology*, Glasgow, England, May 1937, 374–389.

J.C. Hostetter and H.S. Roberts, "Note on the Dissociation of Ferric Oxide Dissolved in Glass and Its Relation to the Color of Iron–Bearing Glasses", *Journal of the American Ceramic Society*, Sep. 1921, 927–938.

Beale, M.D., "Effects of Titanium Dioxide in Glass", *The Glass Industry*, Sep., 1963, p. 495–531.

* cited by examiner

*Primary Examiner*—Karl Group
(74) *Attorney, Agent, or Firm*—Abelman, Frayne & Schwab

(57) ABSTRACT

The invention is a solar control glass having a base glass composition, and colorants consisting essentially of from about 0.40 to 0.93 wt. % $Fe_2O_3$; about 0 to 0.30 wt. % $TiO_2$; and about 0.01 to 0.03 wt. % $Cr_2O_3$. The glass having a light transmission using "A" of at least 70%; a reduced ultraviolet radiation transmittance of less than 35%; a direct solar heat transmittance of less than 45%; a dominant wavelength below 545 nanometers; and a purity of less than 7%.

6 Claims, No Drawings

SOLAR CONTROL GLASS COMPOSITION

BACKGROUND OF THE INVENTION

1. Field of the Invention

This invention refers to a glass composition and a method for the commercial production of a colored glass composition, that it highly desirable for use in the construction industry and mainly in the automotive industry. More particularly, this invention relates to a glass composition that utilizes ferric oxide, titanium oxide and chromium oxide to produce a glass suitable for use in automotive industry with a thickness of about 2.8 millimeters to about 4.0 millimeters.

2. Description of the Related Art

Several patents have been developed for obtaining colored glass, using a standard soda-lime glass base composition.

For automotive use, it is highly desirable that the glass has a high level or percentage of visible light transmission, in order to provide a good vision area of a vehicle, such as a windshield and side and rear windows.

Similarly, it is highly desirable that the glass have the necessary absorption properties to absorb damaging infrared (IR) and ultraviolet (UV) solar light, so as to reduce the excessive heating within the vehicles on sunny days, and to protect the interior of the vehicle from the degradation caused by ultraviolet radiation.

Also, it is well-known that the transmitting characteristics of the glass of different wavelengths can be controlled by adding several absorbent coloring agents in the initial manufacturing mix.

Consequently, for vehicle applications, it has been desirable to use colorants to produce a glass that is able to filter a large portion of the damaging ultraviolet rays from the sun, lower than 39% (measured in the wavelength of λ 300–400 nm and air mass 2 or less than 35% in the same wavelength range with air mass equals 1.5), but that permits the largest possible visible amount (of the luminous rays) up to 70% or more.

The iron is generally present in the glass as both ferrous oxide (FeO) and ferric oxide ($Fe_2O_3$) imparting to the glass a clear green color. The balance between ferrous and ferric oxide has a direct a material effect on the color and transmittance properties of the glass. In this way, in a glass composition, the total amount of iron is present as both ferric oxide ($Fe_2O_3$) and as ferrous oxide (FeO) since, even when pure ferric oxide is used in the basic raw material during the glass forming process, a portion of the ferric oxide is reduced and is transformed into ferrous oxide.

Normally, the total amount of iron in the glass and its amount of ferrous oxides are expressed as being bases on $Fe_2O_3$. It is also standard in this industry to express the quantity of ferrous or ferric oxide as a percentage of the total iron, namely:

$$\% Fe^{+2} \text{ (FERROUS)} = \frac{FeO \times 100}{Total\ Fe_2O_3}$$

$$\% Fe^{+3} \text{ (FERRIC)} = \frac{Fe_2O_3 \times 100}{Total\ Fe_2O_3}$$

The iron oxides (ferric and ferrous) impart different optical properties to the glass, the total quantity of iron present and its equilibrium as ferric or ferrous have a direct impact on the color, light transmission and absorption of infrared and ultraviolet radiations.

The ferric oxide absorbs ultraviolet energy (low transmission level), and at the same time it has a high levels of light transmission, and of infrared energy transmission.

By contrast, ferrous oxide absorbs infrared energy (low transmission level), has a high level of ultra-violet transmission, and a lower level of light transmission and possesses a more intense blue color.

Therefore, the greater the quantity of $Fe_2O_3$ present in the glass, the greater will be the absorption of ultraviolet radiation, and the light transmission is increased but, as the contents of FeO is increased as a result of the chemical reduction of $Fe_2O_3$, the absorption of the infrared radiation will increase, but the absorption of the ultraviolet radiation is decreased and the light transmission is also (undesirable) decreased.

On the other hand, the greater the concentration of FeO in relation to $Fe_2O_3$, results in a change in the color of the glass. The shift toward a higher concentration of FeO in relation to the $Fe_2O_3$ causes a change of color of the glass from a yellow or yellow-green to a darker blue-green undesirable, because it reduces the light transmission of the glass.

Therefore, in order to manufacture a glass with determined properties and color, one must have the correct proportion of $Fe_2O_3$ and FeO, taking into account that what is increased on the ferrous side, will diminish on the ferric one, and consequently one must arrive at a compromise of properties since improving (lowering) the value of one property will worsen (rise) the value of the other properties.

In order to increase the absorption of the infrared and ultraviolet radiation without sacrificing the transmission of the visible spectrum, it has been necessary to lower the total content of the iron which is highly reduced from ferric to ferrous, to less than 0.70% of total iron expressed as $Fe_2O_3$.

Depending on the state of reduction of the glass, the coloring changes as follows:

LOW FERROUS (12%)—YELLOW—HIGH LIGHT TRANSMISSION (HIGH FERRIC)
    YELLOW-GREEN
    GREEN-YELLOW
    GREEN (DESIRABLE)
    GREEN-BLUE
    BLUE-GREEN
    BLUE
HIGH FERROUS (75%)—AMBER—LOW LIGHT TRANSMISSION (LOW FERRIC)

Additionally, it is known that the oxides of titanium, molybdenum and the cerium, principally of cerium, also are colorants, and when they are used in combination with the $Fe_2O_3$, it is possible to obtain an additional reduction of the ultraviolet light transmission to a point where the sought for visibility transmission is achieved. It does, however, suffer from the disadvantage of its high cost, which makes the formulation very expensive, and has a tendency to oxidize the iron to $Fe_2O_3$.

In addition, while the use of $CeO_2$ in quantities from 0.1 to 0.5%, provides absorption of ultraviolet radiation, it has the disadvantage that it tends to change the most desirable green color, to an unacceptable yellowish hue.

In order to control the reduction of the glass formulation, metallic tin, stannic chloride, and mainly coal, have been employed as reducing agents, introduced them in the charge. Coal is used in a finely divided state in an amount of 0.01 to 0.05%, preferably 0.025% of the total amount of the charge.

For maintain a constant ferrous value and conserve the green color of the glass, the amount of coal required to counter the oxidizing effect provoked by the introduction of 1% cerium oxide in a typical glass with a low content of iron, is between the range of 0.9 kilograms per ton of glass. Pursuant to the opinion of some researchers in the field, this level of coal interferes with the humidification action of the silica of the saline cake and, therefore, it results in the formation of silica slag in the smelting furnace.

Similarly, in order to maintain the ferrous value constant, thus counteracting the oxidizing effect, of a constant amount of cerium oxide is added as the content of iron in the glass increases. For example, up to 0.80% of total iron added, it was foreseen that the same amount of coal should be added due to the fact that the level of cerium oxide is constant, or that the requirement of coal should be much greater due to the fact that the equilibrium of the ferrous value would lessen with the greater addition of iron.

Many papers have been published on colored glass compositions with infrared and ultraviolet radiation absorbing characteristics. W. A. Weyl in the book Coloured Glasses, Society of Glass Technology, reprinted 1992, describes diverse theories of colour in glasses related to the current views of the structure and constitution of glass. The use of chromium and its compounds for coloring glasses is described in this book. In the glass industry the chromium is added to the raw materials to obtain a color emerald green which is typical of $Cr^{3+}$. The chromium can be present as $Cr^{6+}$ as $CrO_4^{2-}$ to obtain a lightly yellow color and as $Cr^{2+}$ through which the emerald green is obtained.

C. R. Bamford, in the book Colour Generation and Control in Glass, Glass Science and Technology, Elsevier Science Publishing Co., Amsterdan, 1977; describes the principles, the methods, and the applications about the colouration of glass. In this book the author considers that three elements govern the colour of the light transmitted by a glass, namely: the colour of the incident light; the interaction of the glass with that light; and the interaction of the transmitted light with the eye of the observer. The procedures require the spectral transmission data of the glass at the relevant glass thickness and the relevant angle of viewing.

K. M. Fyles in the paper Modern Automotive Glasses, Glass Technology, vol 37, February, 1996, pp 2–6, considers that the iron is the most important colorant in modern automotive glasses since it is the only cheaply available component which absorbs harmful ultraviolet radiation (ferric iron) and also absorbs a large proportion of the infrared (ferrous iron).

Werner Vogel in the book Chemistry of Glass; The American Ceramic Society, Inc. 1985, consider that in general the colorless glass present an absorption in the UV region for base glasses. For example the glasses with a longer transmission in the UV are the phosphate glasses, silica glasses, boron glasses, germanium glasses, etc.

Gordon F. Brewster, et al, in the paper "The color of iron-containing glasses of varying composition", Journal of the Society of Glass Technology, New York, USA, April, 1950, pp 332–406, is related to the colours changes caused by systematic composition variations in iron-containing silicate and silica-free glasses evaluated in terms of visual colour, spectral transmission and chromaticity.

Other papers also describe the importance of the equilibrium between ferrous and ferric oxides in glasses ("N. E. Densem; The equilibrium between ferrous and ferric oxides in glasses; Journal of the Society of Glass Technology, Glasgow, England, May 1937, pp. 374–389"; "J. C. Hostetter and H. S. Roberts, "Note on the dissociation of Ferric Oxide dissolved in glass and its relation to the color of iron-bearing glasses; Journal of the American Ceramic Society, USA, September, 1921, pp. 927–938").

Finally, the paper "Effects of Titanium Dioxide in Glass" by M. D. Beals, The Glass Industry, September, 1963, pp 495–531, describes the interest that has been shown the titanium dioxide as a constituent of glasses. The effects produced by the use of titanium dioxide included the comments that $TiO_2$ greatly increases the refractive index, increases the absorption of light in the ultraviolet region, and that is lowers the viscosity and surface tension. From the data on the use of titanium dioxide in enamels, they noted that $TiO_2$ increases the chemical durability and acts as a flux. In general, clear glasses containing titanium dioxide may be found in all of the common glass-forming systems (borates, silicates, and phosphates). The various regions of glass formation for systems containing titanium dioxide are not grouped in any one place, since the organization of the discussion is based more on the properties an uses of glasses containing titanium dioxide than on their constitution alone.

On other hand, patents that have been developed for obtaining colored glass, using a standard soda-lime glass base composition are the following:

The U.S. Pat. No. 4,792,536 to Pecoraro, et al, claims a transparent infrared absorbing glass having at least 0.45 percent by weight iron expressed as $Fe_2O_3$, forming a glass into a flat glass product. The oxidation-reduction conditions are controlled in a stage of the production process and in subsequent stages so as to yield a glass having at least 35 percent of the iron in the ferrous state expressed as FeO and which when formed into a flat glass product of suitable thickness exhibits the combination of luminous transmittance of at least 65 percent and infrared transmittance of no more than 15 percent.

U.S. Pat. No. 5,077,133 to Cheng, claims a glass having a final composition that includes 0.51% to 0.96% of $Fe_2O_3$; 0.15% to 0.33% of FeO and 0.2% to 1.4% of $CeO_2$, wherein the percentage by weight of FeO, represents a percentage reduction of the total iron, expressed as $Fe_2O_3$, from 23% to 29%, so that the glass has an illuminating wavelength of C, from 498 to 525 nanometers (nm) and a hue purity of 2% to 4%.

In order to obtain the latter, U.S. Pat. No. 5,112,778 also to Cheng, indicates that the redox reaction is balanced between the ferric and ferrous oxides, the cerium oxide and the coal in a soda-lime-silica glass, changes to a state of a greater reduction when the content of total iron is increased up to a 0.05% to a 0.8%, The reason for which the ferrous value increases instead of decrease, a situation that was expected. Consequently, in order to change the reduction state so as to obtain the same ferrous value found in the lesser concentration of the total iron, the quantity of coal added to the smelting furnace, which has a total content of iron, must be diminished, a statement which is contrary to the teaching of the prior art, i.e. it will require less coal for a high content of total iron in the formulation of the soda-lime-silica glass.

The main disadvantage of the glasses describes in the Cheng patents, is that, as has already been mentioned, they necessarily include the $CeO_2$ as an agent to control the reduction for the formulation, mainly the $Fe_2O_3$.

Finally, another known ingredient present in the soda-lime-silica glass is sulfuric trioxide ($SO_3$). Sodium sulfate ($Na_2SO_4$) is added to the mixtures of the glass as a refining agent at a high temperature, which is used principally as an agent for bubble elimination, and promotes mass transport, attacks free silica at the surface of the glass and lessens the number of solid inclusions.

On the other hand, the sodium sulfate has oxidizing properties, which is the reason why normally small amounts of carbon are added to the mixture, in order to prevent oxidation and at the same time lower the temperature of reaction.

During the manufacture of the glass, the $Na_2SO_4$, which is the main contributor of sulfur in the glass, converts into $SO_3$, which controls the conversion of the $Fe_2O_3$ into FeO. However, the $SO_3$ present in the final glass does not affect the ability of the glass to transmit visible light.

The amount of $SO_3$ dissolved in the glass decreases if it has:

1. A lesser quantity (proportion-wise) of the sodium sulfate.
2. Greater smelting properties.
3. Greater smelting times.
4. A furnace environment that has greater oxidation action.
5. Greater reduction of the iron to ferrous oxide (greater $Fe^{+2}$ lesser $Fe^{+3}$) arriving at a minimum of 70–75% of the $Fe^{+2}$.

Therefore, the quantity and effects of the $SO_3$ in the glass charge has to be balanced in accordance with the amount of carbon present in the charge.

Furthermore, it is a common knowledge that the $SO_3$ in the glass charge must to be within certain critical quantities because lesser amounts of $SO_3$ in the glass charge will affect the refining properties, i.e. the ability to eliminate bubbles in the smelting furnace.

It is upon these bases, that the U.S. Pat. No. 5,214,008 to Beckwith and U.S. Pat. No. 5,240,866 to Gulotta who claim, respectively, a green glass having the property of ultraviolet radiation absorbent, which contains 0.7% to 0.95% of total iron, approximately 0.19% to 0.24% of FeO and approximately 0.20 to 0.25% of $SO_3$ (in the absence of $CeO_2$), and a green glass of ultraviolet radiation absorbent with a total iron content greater than 0.85%, a content of $CeO_2$ less than 0.5%, and a relation to the FeO/total iron of less than 0.275%. The Gulotta's patent describe that the glass reduces the amount of costly cerium required to yield low ultraviolet transmittance, viz., no greater than 31 percent (300 to 390 nanometers) at a reference thickness of 3.9 millimeters.

Other example of a colored glass composition is disclosed in U.S. Pat. No. 5,308,805 to Baker, et al, which describes a neutral, generally green-gray low transmittance (no more than 25 luminous transmittance) soda-lime-silica glass which has a reduced solar energy transmittance, which contains 1.3% to 2% of $Fe_2O_3$ (total iron) 0.01% to 0.05% of NiO; 0.02% to 0.04% of CoO; and 0.0002% to 0.003% of Se. 1.3% to 2% of $Fe_2O_3$. The glass has a ferrous value in the range of 18 to 30.

In the U.S. Pat. No. 5,776,845 to Boulos, et al, a green soda-lime-silica glass composition having excellent ultra violet absorbing ability while having a relatively high light transmittance is described. The colorants of the glass composition consist essentially of: greater than 0.5% to 1.5% of total iron oxide as $Fe_2O_3$; wherein the weight ratio of $Fe^{+2}/Fe^{+3}$ is less than 0.35%; 0.10 wt. % to 2.00 wt. % manganese compound as $MnO_2$; and optionally any of: up to 1.00 wt. % titanium oxide as $TiO_2$, up to 1.00 wt. % cerium oxide as $CeO_2$; up to 1.00 wt. % vanadium oxide as $V_2O_5$; and up to 0.20 wt. % chromium oxide as $Cr_2O_3$; the glass composition having, at 4.0 mm thickness; 55 to 80% light transmittance using Illuminant A with less than 46% ultra violet transmittance measured over the range of 300 to 400 nanometers.

The U.S. Pat. No. 5,830,812 to Shelestak, et al describes a green colored glass using a standard soda-lime-silica glass base composition and additionally iron, cerium, chromium and, optionally, titanium as infrared and ultraviolet radiation absorbing materials and colorants. Preferably, the glass have a green color characterized by a dominant wavelength in the range of about 500 to 565 nanometers with an excitation purity of no higher than about 5% and include about 0.50 to 1.0 wt. % total iron, about 0.26 to 0.65 wt. % $Fe_2O_3$, about 0.05 to 3 wt. % $CeO_2$; 0 to about 2 wt. % $TiO_2$, and about 20 to 650 PPM $Cr_2O_3$. The redox ratio for the glass is maintained between about 0.20 to 0.55 and preferably between 0.20 and 0.30. The glass compositions disclosed in the present invention have an LTA of at least about 65%, preferably at least 70%, a TSUV of no greater than 38%, preferably no greater than 35%, a TSIR of no greater than about 35%, preferably no greater than about 30%, and a TSET of no greater than about 50%, preferably, no greater than about 45%.

The Shelestak patent uses the oxides of titanium and mainly cerium, as colorants, and when they are used in combination with the $Fe_2O_3$, it is possible to obtain an additional reduction of the ultraviolet light transmission to a point where the sought for visibility transmission is achieved. It does, however, suffer from the disadvantage of its high cost, which makes the formulation very expensive, and has a tendency to oxidize the iron to $Fe_2O_3$.

In addition, while the use of $CeO_2$ in quantities from 0.05 to 3%, provides absorption of ultraviolet radiation, it has the disadvantage that it tends to change the most desirable green color, to an unacceptable yellowish hue.

As it can be clearly appreciated from the above patents, in order to express the visible light transmission characteristics of a glass, it is necessary to take into account the following three main points:

1. The thickness at which it is measured, since the transmission of UV, visible light and infrared decline in direct relation with the increase of the thickness of the glass.
2. The wavelengths of the different zones, for example the UV transmission is considered to be from 300 to 400 nm (General Motors); from 300 to the half the value of 400 nm (Ford), since the other half is transferred to the visible light; from 300 to 390 nm (PPG's U.S. Pat. No. 5,240,866); from 282.5 to 377.5 nm in ISO; as well as if the increments were from 2.5, 5 or 10 nm.

Consequently, there will be different values when measuring the ultraviolet transmission for the same product.

3. The norm utilized in respect to the solar energy, should be established beforehand, for example: "CIE PUBL:" 40; and the air mass, Perry & Moon Air Mass=to 1, Air Mass=0.2 or air mass 1.5 as recent GM0101R standard.

It should be mentioned that the addition of $Na_2SO_4$ as a source of $SO_3$ in the glass, is already well known, and that some U.S. patents such as U.S. Pat. Nos. 2,755,212, and 4,792,536 already mention to content of $SO_3$ in quantities of 0.29% and 0.02%, respectively, the range of $SO_3$ as been between 0.20% and 0.25% in the glass of the U.S. Pat. No. 5,214,008 is considered critical and is a limitation on the scope of that patent.

According to the present invention, there is provided a soda-lime-silica glass composition that utilizes ferric oxide, titanium oxide and chromium oxide to produce a glass suitable for use in automotive industry with a thickness of about 2.8 millimeters to about 3.9 millimeters and preferably between 3.4 to 3.6 mm.

The soda-lime-silica glass composition consists essentially of about 0.40 to 0.90 wt. % $Fe_2O_3$, of about 0.10 to about 0.30 wt. % $TiO_2$, and about 0.01 to 0.03 wt. % $Cr_2O_3$, to produce a glass having a thickness of about 2.8 millimeters to about 4 millimeters, and preferably between 3.4 to 3.6 mm with a light transmission (TLUZ) using "A" of at least 70%; a reduced ultraviolet radiation transmittance of less than 35% using air mass equals 1.5 from 300 to 400 ηm; a direct solar heat transmittance of less than 45%; a dominant wavelength below 517 ηm; and a purity of less than 7%.

SUMMARY OF THE INVENTION

It is therefore the main objective of the present invention to provide of a solar control glass composition which can be manufactured a thickness of about 3.4 millimeters to about 4 millimeters, with a light transmission (TLUZ) using "A" of at least 70%; a reduced ultraviolet radiation transmittance of less than 35% using air mass equals 1.5 from 300 to 400 ηm; a direct solar heat transmittance of less than 45%; a dominant wavelength below 517 ηm; a purity of less than 7%; and, a color tint as defined by the CIELAB, in the ranges a* from −14.49 to −5.07, preferably between −11 to −7, b* from +8.88 to +1.78, preferably between 0.5 to 3.5, and having an L* value greater than 82.

Similarly is another objective of the present invention is to provide a solar control glass composition, of the previously mentioned nature, that does not contain cerium oxide, and which the content consists essentially of about 0.40 to 0.90 wt. % $Fe_2O_3$, of about 0.10 to about 0.30 wt. % $TiO_2$, and about 0.01 to 0.03 wt. % Cr2O3.

In addition, still another main objective of the present invention to provide a solar control glass composition, that reduce the thickness of a glass sheet maintaining its desirable properties of transmission of visible light and of the absorption of infrared and ultraviolet radiation.

Another objective of the present invention to provide a solar control glass composition whose production is more economical due to the absence of cerium oxide.

These and other objectives and advantages of the solar control glass composition, of the present invention will become evident to persons who have knowledge in the field, from the following detailed description of the invention, in relation to a specific embodiment.

DETAILED DESCRIPTION OF THE INVENTION

The invention will now be described in relation to a specific embodiment, wherein the amounts of the main components which are critical for obtaining a solar control glass composition with the desired properties of visibility transmission and the absorption of infrared and ultraviolet radiation are set forth.

The typical composition of soda-lime-silica glass used in the construction and automotive industry, and formed by the so-called glass float process, is characterized by the following formulation based on wt. % with regard to the total weight of the glass:

| Components | wt. % |
| --- | --- |
| $SiO_2$ | 70 to 73 |
| $Na_2O$ | 13 to 14 |
| CaO | 7 to 9 |
| MgO | 3.5 to 4.2 |
| $K_2O$ | 0.0 to 0.6 |

-continued

| Components | wt. % |
| --- | --- |
| $Al_2O_3$ | 0.1 to 1.0 |
| $Fe_2O_3$ | 0.0 to 0.1 |
| $SO_3$ | 0.2 to 0.3 |

The solar control glass composition of the present invention is based on the above disclosed composition, to which the following coloring compounds have been added:

| Components | wt. % |
| --- | --- |
| $Fe_2O_3$ | 0.40 to 0.90 |
| $TiO_2$ | 0.10 to 0.30 |
| $Cr_2O_3$ | 0.01 to 0.03 |

When the coloring compounds were added to the basic composition, a glass sheet with a thickness of about 3.4 millimeters to about 4 millimeters was manufactured, resulting with a light transmission (TLUZ) using "A" of at least 70%; a reduced ultraviolet radiation transmittance of less than 35% using air mass equals 1.5 from 300 to 400 ηm; a direct solar heat transmittance of less than 45%; a dominant wavelength below 545 ηm, and preferable less than 517 ηm; a purity of less than 7%; and a color tint as defined in the CIELAB, in the ranges a* (green-red) from −14.49 to −5.07, preferably from −11 to −7, b* (blue-yellow) from +8.88 to +1.78, preferably from 0.5 to 3.5, and having an L* value greater than 82.

It is common in the glass industry to refer the total iron content in the glass composition or in the glass melting mixture, as the total iron expressed as $Fe_2O_3$.

When a lot of glass is melted, part of that amount of total iron is reduced to FeO, while the rest is maintained as $Fe_2O_3$. The balance between the ferric and ferrous oxidation states in the melted mixture are the result of an equilibrium of the final oxidation reduction state, which is a mixture between the use of oxidation or reducing agents in the feed mixture and to the combustion characteristics, for example, the air-gas relationship used in the furnace in order to melt the mixture. The reduction of produces not only FeO, but also oxygen, decreasing the combined weight of the two compounds of iron in the resulting glass.

Consequently, the combined weight of the FeO and $Fe_2O_3$ contained in the resulting glass composition, will be minor, less than that fed during the mixture, and less than the total of the initial iron used expressed as $Fe_2O_3$. For this reason, it is understood that the total iron is the iron expressed as $Fe_2O_3$, as it is used herein, as meaning the amount of iron fed in the mixture before its reduction. And it is to be understood that the reduction value of the ferrous state is defined as the weight of the ferrous oxide (FeO) expressed as $Fe_2O_3$ in the glass product, divided by the weight percentage of total iron expressed in the form of reduction percentage.

The physical properties such as light transmission correspond to calculated variables based on internationally accepted standards. So that, the light transmission is evaluated using the illuminant "A" and standard Observer of 2°, also known as of 1931 [C.I.E. Publication, 15.2, ASTM E-308 (1990)]. The wavelength range used for these purposes is of 380 to 780 ηm, integrating values in numeric form with intervals of 10 ηm. The solar energy transmission represents the heat which the glass achieves in direct form, evaluating it from 300 ηm to 2150 ηm with intervals of 50 ηm, the numeric form of calculation uses as recognized standard values those reported by Parry Moon in "Proposed Standard Solar Radiation Curves for Engineer Use", Franklin Institute, vol. 230, p. 604, table II, 1940.

The calculation of the ultraviolet radiation transmission (UV), involves only the participation of the solar UV radiation, so that it is evaluated in the range of 300 to 400 ηm of wavelength using intervals of 10 ηm and air mass equals 1.5. For the infrared radiation transmission (IR), it is only contemplated, as well as the UV radiation, the range wherein the solar spectrum has influence, so that the range of the near infrared region from 800 to 2150 ηm, with intervals of 50 ηm, is used. Both calculations use the solar radiation values of ISO standards.

The amount of solar heat which is transmitted through the glass also can be calculated by the contribution of thermal energy with which participates each one of the regions wherein the solar spectrum has influence, which is from the ultraviolet region (280 ηm), to near infrared region (2150 ηm), which is of 3% for UV, 44% for the visible and of 53% in order for the IR, however, the values of the direct solar energy transmission, in the present invention, are calculated on the basis of a numeric integration taking into account the whole range of the solar spectrum of 300 to 2150 ηm, with intervals of 50 ηm and using the values of solar radiation reported ISO standards.

The specifications for the determination of color such as the dominant wave length and the purity of excitement have been derived from the tristimulus values (X, Y, Z), which have been adopted by the International Commission of Illumination (C.I.E.), as direct result of experiments involving many observers. These specifications could be determined by the calculation of the three-chromatic coefficients X, Y, Z of the tristimulus values that corresponding to the red, green and the blue colors, respectively. The three-chromatic values were graphicated in the chromaticity diagram and compared with the coordinates of the illuminant "C" considered as illumination standard. The comparison provides the information in order to determine the color purity excitement and its dominant wavelength. The dominant wavelength defines the wavelength of the color and its value is located in the visible range, of the 380 to 780 ηm, while for the purity of excitement, the less the value is, the nearest tends to be a neutral color. A deeper understanding of the topics can be obtained from the "Handbook of Colorimetry" published by the "Massachussets Institute of Technology", of Arthur C. Hardy, issued in 1936.

The color variables L*, a* y b* of the color system CIELAB 1976, are also calculated through the tristimulus values.

The table I show the results for a first experiment, wherein the coloring compounds considered in this invention were added, all of them combined with a typical composition of soda-lime-silica glass.

TABLE I

| Melting | Sample 1 | Sample 2 | Sample 3 | Sample 4 |
|---|---|---|---|---|
| % Fe2O3 | 0.900 | 0.900 | 1.030 | 1.030 |
| % TiO$_2$ | 0.100 | 0.100 | 0.000 | 0.000 |
| % Cr$_2$O$_3$ | 0.010 | 0.030 | 0.026 | 0.026 |
| Esp (mm) | 3.52 | 3.46 | 3.52 | 3.51 |
| % T UV | 34.873 | 32.065 | 30.018 | 30.131 |
| % T LUZ | 70.908 | 70.597 | 66.756 | 68.254 |
| % T CAL | 42.529 | 46.325 | 42.704 | 45.696 |
| % T IR | 22.470 | 31.034 | 26.591 | 31.200 |
| COLOR D65 10° | | | | |
| L* | 87.43 | 87.29 | 86.09 | 86.73 |
| a* | −9.96 | −11.77 | −11.64 | −10.98 |
| b* | 3.30 | 7.55 | 8.39 | 8.87 |
| X | 62.80 | 61.91 | 56.64 | 61.07 |
| Y | 70.89 | 70.59 | 68.17 | 69.45 |
| Z | 71.91 | 67.49 | 63.17 | 63.88 |
| A 2° | | | | |
| Y | 68.96 | 69.10 | 66.76 | 68.26 |
| C 2° | | | | |
| x | 0.3000 | 0.3075 | 0.3062 | 0.3081 |
| y | 0.3299 | 0.3399 | 0.3430 | 0.3434 |
| Y | 70.77 | 70.47 | 68.35 | 69.69 |
| λdom (ηm) | 508.35 | 544.84 | 541.86 | 545.44 |
| % purity | 3.38 | 5.77 | 6.25 | 6.06 |

In accordance with the experiment, a direct effect of the Fe2O3 in all the physical properties was observed: UV transmittance, light transmission, infrared and hot. Furthermore, a dominant influence toward a green color is advantaged (a* in the negative zone), which was increased in a direct relation to the addition of the Fe in the glass.

A second series of experiments were carried out.

TABLE II

| Melting | Sample 5 | Sample 6 | Sample 7 | Sample 8 | Sample 9 | Sample 10 | Sample 11 |
|---|---|---|---|---|---|---|---|
| % Fe$_2$O$_3$ | 0.800 | 0.900 | 0.900 | 0.880 | 0.880 | 0.870 | 0.870 |
| % TiO$_2$ | 0.100 | 0.100 | 0.300 | 0.100 | 0.150 | 0.150 | 0.150 |
| % Cr$_2$O$_3$ | 0.010 | 0.010 | 0.010 | 0.010 | 0.005 | 0.005 | 0.005 |
| Esp (mm) | 3.52 | 3.57 | 3.47 | 3.52 | 3.53 | 3.51 | 3.50 |
| % T UV | 36.957 | 34.873 | 29.183 | 34.456 | 34.141 | 33.995 | 35.227 |
| % T LUZ | 73.140 | 70.908 | 70.595 | 71.944 | 72.411 | 74.708 | 70.154 |
| % T CAL | 46.847 | 42.529 | 45.931 | 43.606 | 43.779 | 48.472 | 40.630 |
| % T IR | 28.219 | 22.470 | 29.547 | 23.595 | 23.362 | 29.890 | 19.068 |
| COLOR D65 10° | | | | | | | |
| L* | 88.48 | 87.43 | 87.28 | 87.91 | 88.14 | 89.21 | 87.11 |
| a* | −8.65 | −9.96 | −9.23 | −9.64 | −9.26 | −7.69 | −9.77 |

TABLE II-continued

| Melting | Sample 5 | Sample 6 | Sample 7 | Sample 8 | Sample 9 | Sample 10 | Sample 11 |
|---|---|---|---|---|---|---|---|
| b* | 3.73 | 3.30 | 5.83 | 4.02 | 3.59 | 4.12 | 1.78 |
| X | 65.36 | 62.80 | 63.00 | 63.84 | 64.45 | 67.20 | 62.29 |
| Y | 73.07 | 70.89 | 70.59 | 71.88 | 72.38 | 74.61 | 70.23 |
| Z | 73.63 | 71.91 | 69.79 | 72.04 | 73.09 | 74.73 | 73.11 |
| A 2° | | | | | | | |
| Y | 71.51 | 68.96 | 69.36 | 70.14 | 70.64 | 73.32 | 68.09 |
| C 2° | | | | | | | |
| x | 0.3029 | 0.3000 | 0.3076 | 0.3018 | 0.3017 | 0.3052 | 0.2975 |
| y | 0.3296 | 0.3299 | 0.3341 | 0.3310 | 0.3296 | 0.3296 | 0.3260 |
| Y | 73.02 | 70.77 | 70.49 | 71.81 | 72.28 | 74.59 | 70.01 |
| λ dom(ηm) | 515.26 | 508.35 | 542.23 | 514.22 | 511.63 | 526.02 | 500.46 |
| % purity | 2.68 | 3.38 | 4.18 | 3.02 | 2.93 | 2.63 | 4.17 |

The UV transmission and light are reduced when the amount of $Cr_2O_3$ is increased in the glass. By this reason, the amount of $Cr_2O_3$ is added in concentrations very low, less than 300 ppm.

In accordance with the obtained results (color system CIELAB), was possible to observe the color change in the glass when a component is increased and the others are maintained constant, for example, if the % $Fe_2O_3$ is increased and the concentration of $TiO_2$ is maintained in 0.15% and the $Cr_2O_3$ in 0.05%, the color of glass is changed toward to a green color lightly more blue, and if the % of $Fe_2O_3$ is diminished the color of the glass is less green and lightly yellow.

In the same way, if the $Cr_2O_3$ is increased and the glass is maintained with 0.87% of $Fe_2O_3$ and 0.15% of $TiO_2$, the glass acquire a yellow-green color. If the concentration of $Cr_2O_3$ is reduced below of 0.005%, the color is blue with a trend to be lightly red.

In the case of the $TiO_2$, if this is increased, a glass with a yellow color loosening the light green color is obtained. However, if the content of $TiO_2$ is reduced, a blue-green color is obtained.

The results obtained with a preferred embodiment of the glass composition are showed in the Table III.

TABLE III

| Melting | Sample 12 | Sample 13 | Sample 14 | Sample 15 | Sample 16 | Sample 17 | Sample 18 | Sample 19 |
|---|---|---|---|---|---|---|---|---|
| % $Fe_2O_3$ | 0.860 | 0.880 | 0.860 | 0.880 | 0.870 | 0.870 | 0.870 | 0.870 |
| % $TiO_2$ | 0.100 | 0.100 | 0.150 | 0.150 | 0.150 | 0.150 | 0.150 | 0.150 |
| % $Cr_2O_3$ | 0.010 | 0.010 | 0.005 | 0.005 | 0.005 | 0.005 | 0.005 | 0.005 |
| Esp (mm) | 3.51 | 3.52 | 3.52 | 3.53 | 3.51 | 3.48 | 3.51 | 3.50 |
| OPTICAL PROPERTIES | | | | | | | | |
| % T UV | 35.503 | 34.456 | 34.905 | 34.141 | 33.995 | 34.470 | 35.113 | 35.227 |
| % T LUZ | 72.813 | 71.944 | 72.801 | 72.411 | 74.708 | 74.032 | 72.375 | 70.154 |
| % T CAL | 45.499 | 43.606 | 44.098 | 43.770 | 48.472 | 46.676 | 42.883 | 40.630 |
| % T IR | 26.213 | 23.595 | 23.299 | 23.362 | 29.890 | 27.059 | 21.404 | 19.068 |
| COLOR D65 10° | | | | | | | | |
| L* | 88.31 | 87.91 | 88.36 | 88.14 | 89.21 | 88.91 | 88.16 | 87.11 |
| a* | −9.10 | −9.64 | −8.90 | −9.26 | −7.69 | −8.16 | −9.29 | −9.77 |
| b* | 4.054 | 4.02 | 2.86 | 3.59 | 4.12 | 3.51 | 2.47 | 1.78 |
| X | 64.85 | 63.84 | 65.01 | 64.45 | 67.20 | 66.41 | 64.47 | 62.29 |
| Y | 72.73 | 71.88 | 62.81 | 72.38 | 74.61 | 73.98 | 72.40 | 70.23 |
| Z | 72.88 | 72.04 | 74.46 | 73.09 | 74.73 | 74.84 | 74.54 | 73.11 |
| A 2° | | | | | | | | |
| Y | 71.11 | 70.14 | 71.02 | 70.64 | 73.32 | 72.48 | 70.45 | 68.09 |
| C 2° | | | | | | | | |
| x | 0.3028 | 0.3018 | 0.3010 | 0.3017 | 0.3052 | 0.3034 | 0.2996 | 0.2975 |
| y | 0.3306 | 0.3310 | 0.3277 | 0.3296 | 0.3296 | 0.3286 | 0.3271 | 0.3260 |
| Y | 72.68 | 71.81 | 72.67 | 72.28 | 74.59 | 73.91 | 72.22 | 70.01 |
| λ dom(ηm) | 516.79 | 514.22 | 507.05 | 511.63 | 516.02 | 515.11 | 503.96 | 500.46 |
| % purity | 2.84 | 3.02 | 3.02 | 2.93 | 2.63 | 2.48 | 3.44 | 4.17 |

All the fusions were presented under same conditions of oxide-reduction in the batch and also in the furnace. Only the % wt of the components were modified.

From the above, a solar control glass composition has been described and will apparent for the experts in the art that many other features or improvements can be made, which can be considered within the scope determined by the following claims.

What is claimed is:

1. A solar control glass having a base glass composition, comprising by weight: 70 to 73% of $SiO_2$; 13 to 14% of $Na_2O$; 7 to 9% of CaO, 3.5 to 4.2% of MgO; 0.0 to 0.6% $K_2O$; 0.1 to 1.0% $Al_2O_3$; 0.0 to 0.1% $Fe_2O_3$; and, 0.2 to 0.3% of $SO_3$ and colorants consisting essentially of from about 0.40 to 0.93 wt. % $Fe_2O_3$; from about 0 to about 0.30 wt. % $TiO_2$; and from about 0.01 to 0.03 wt % $Cr_2O_3$; the glass having a light transmission using "A" of at least 70%; a reduced ultraviolet radiation transmittance of less than 35%; a direct solar heat transmittance of less than 45%; a dominant wavelength below 545 nanometers; and a purity of less than 7%.

2. The solar control glass as defined in claim 1, wherein the dominant wavelength is preferably less than 517 nanometers.

3. The solar control glass as defined in claim 1, wherein said glass has a color tint in a range a* (green-red) from −14.49 to −5.07, b*(yellow-blue) from +8.88 to +1.78, and having an L* value greater than 82.

4. The solar control glass as defined in claim 1, wherein said glass has a color tint in a range a* (green-red) from −11 to −7.

5. The solar control glass as defined in claim 1, wherein said glass has a color tint in a range b*(yellow-blue) from 0.5 to 3.5.

6. The solar control glass as defined in claim 1, wherein said glass is produced with a thickness from about 2.8 millimeters to about 4 millimeters.

* * * * *